(12) United States Patent
Ramus et al.

(10) Patent No.: US 9,902,536 B2
(45) Date of Patent: Feb. 27, 2018

(54) SURGE TANK AND CAP

(71) Applicants: GM Global Technology Operations LLC, Detroit, MI (US); Toledo Molding & Die, Inc., Toledo, OH (US)

(72) Inventors: Timothy W. Ramus, Warren, MI (US); Robert F. Olsen, Monroe, MI (US)

(73) Assignees: GM Global Technology Operations LLC, Detroit, MI (US); Toledo Molding & Die, Inc., Toledo, OH (US)

(*) Notice: Subject to any disclaimer, the term of this patent is extended or adjusted under 35 U.S.C. 154(b) by 162 days.

(21) Appl. No.: 14/660,149

(22) Filed: Mar. 17, 2015

(65) Prior Publication Data

US 2016/0272383 A1    Sep. 22, 2016

(51) Int. Cl.
*B65D 90/34* (2006.01)
*B65D 51/16* (2006.01)
*B60K 15/03* (2006.01)
*B60K 15/035* (2006.01)

(52) U.S. Cl.
CPC .......... *B65D 51/1638* (2013.01); *B60K 15/03* (2013.01); *B60K 2015/0344* (2013.01); *B60K 2015/0358* (2013.01); *B60K 2015/03296* (2013.01)

(58) Field of Classification Search
CPC ............ B65D 51/1633; B65D 51/1661; B65D 51/1672; B65D 51/1688; B65D 51/16; B65D 51/1638; B65D 41/0442; B65D 2205/00; B65D 2205/02; B60K 15/03; B60K 15/03006; B60K 15/077; B60K 2015/0777
USPC .... 220/89.1, 746, 366.1, 303; 215/341, 352, 215/307, 311, 314
See application file for complete search history.

(56) References Cited

U.S. PATENT DOCUMENTS

| 3,831,801 A | * | 8/1974 | Rodgers | .................. F16K 17/19 137/493 |
| 2004/0056034 A1 | * | 3/2004 | Reutter | ................ F01P 11/0238 220/303 |
| 2009/0078627 A1 | * | 3/2009 | Jannot | .................... B60K 15/03 210/120 |
| 2011/0192934 A1 | * | 8/2011 | Mark | ....................... B64D 1/16 244/118.1 |

* cited by examiner

*Primary Examiner* — Steven A. Reynolds
*Assistant Examiner* — Javier A Pagan
(74) *Attorney, Agent, or Firm* — BrooksGroup

(57) ABSTRACT

The disclosure may generally relate to a tank which may include a fluid portion and an expansion portion which may be disposed below the fluid portion. Moreover, a three seal pressure relief cap may be constructed and arranged to allow a user to safely remove the pressure relief cap at any temperature.

9 Claims, 4 Drawing Sheets

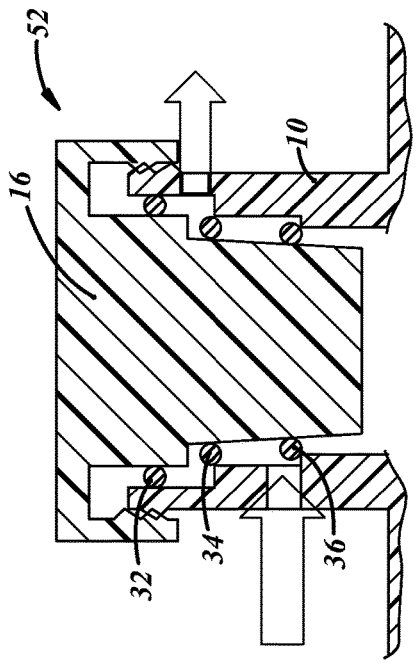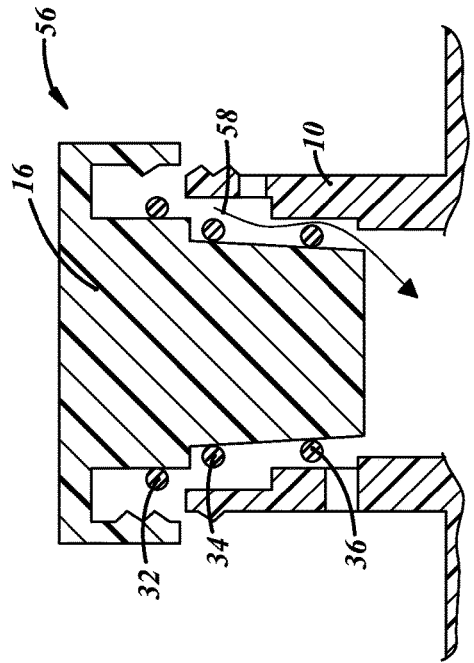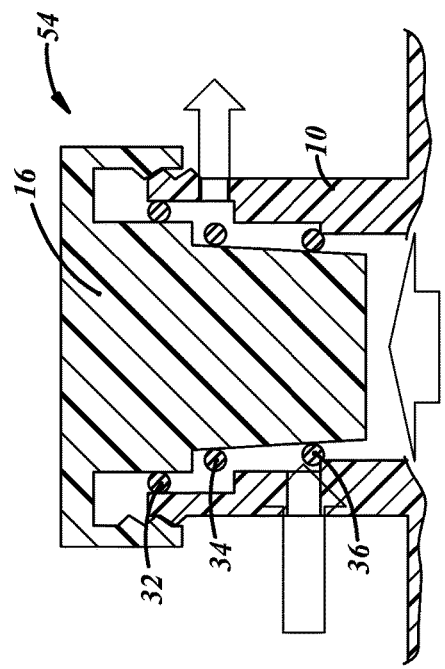

SURGE TANK AND CAP

TECHNICAL FIELD

The field to which the disclosure generally relates to includes vehicle operational systems.

BACKGROUND

Vehicle operational systems may include various fuel operations.

SUMMARY OF ILLUSTRATIVE VARIATIONS

A number of variations may include a tank which may include a fluid portion and an expansion portion disposed below the fluid portion. Moreover, the tank may further include a three seal pressure relief cap which may be constructed and arranged to allow a user to safely remove the pressure relief cap at any temperature.

A number of other variations may include a product which may include a fluid inlet and a fluid portion which may be disposed adjacent to the fluid inlet. A fluid may flow from the inlet through the fluid portion. The product may further include an expansion portion which may be disposed below the fluid portion. The fluid may expand and once the fluid portion is full the fluid may flow downward into the expansion portion. Moreover, a pressure relief cap may be disposed at the end of the expansion portion. The pressure relief cap may be constructed and arranged to allow a user to safely remove the pressure relief cap at any temperature.

Yet another variation may include a method which may include flowing fluid from an inlet into a top portion of the tank, and then expanding the fluid until the top portion is full and the fluid flows down into an expansion portion. Next, the fluid may expand upwards in the expansion portion toward a pressure relief cap. The pressure relief cap may be safely removed at any temperature. Moreover, the pressure relief cap may include a top seal, a middle seal and a bottom seal.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 7A shows a schematic view of the tank and relief cap;

FIG. 7B shows a schematic view of the tank and relief cap;

FIG. 7C shows a schematic view of the tank and relief cap; and

FIG. 7D shows a schematic view of the tank and relief cap.

DETAILED DESCRIPTION OF ILLUSTRATIVE VARIATIONS

The following description of the variations is merely illustrative in nature and is in no way intended to limit the scope of the invention, its application, or uses.

Referring now to the variations illustrated in FIGS. 1-7, a tank 10 may be provided and may include a fluid portion 12 and additionally may include an expansion portion 14 which may be disposed below the fluid portion 12. Moreover, a three seal pressure relief cap 16 may be included and may be constructed and arranged to allow a user to safely remove the pressure relief cap 16 at any temperature.

Figure 1:
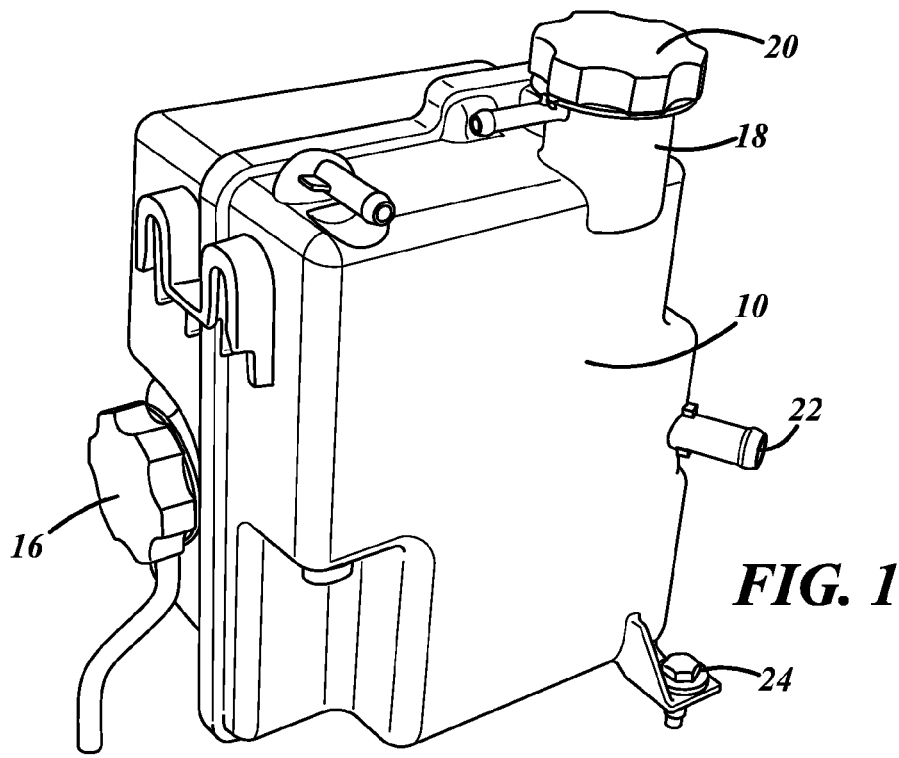
FIG. 1 shows a tank according to a number of variations.

Referring now to the variation illustrated in FIG. 1, the tank 10 may be comprised of aluminum, steel, a plastic polymer material, or any other material as desired by one of ordinary skill in the art. Moreover, the tank 10 may include at least one inlet 18 which may be covered by a fill cap 20 when not in use. Additionally or alternatively the fill cap 20 may be disposed adjacent to the inlet 18 or any other location as desired by one of ordinary skill in the art. Moreover, the tank 10 may include at least one outlet 22. The outlet 22 may be configured to allow fluid to flow from the inlet 18 to the outlet 22. As illustrated in the variation shown in FIG. 1, the inlet 18 and the outlet 22 may be disposed in the fluid portion 12 of the tank 10. The tank 10 may be of any size and shape as desired by one of ordinary skill. More specifically, the tank 10 may be designed to fit into a vehicle hood or other vehicle location and may be constructed and arranged in an optimal shape as known by one of ordinary skill in the art. It is contemplated that the tank 10 may be fixed to the vehicle using at least one fixation device 24. Moreover, it is also contemplated that the pressure relief cap 16 may be disposed on a side of the tank 10. It is also contemplated that the pressure relief cap 16 may be disposed at the end of the expansion portion 14. The pressure relief cap 16 may additionally be disposed anywhere as desired by one of ordinary skill in the art.

Figure 2:
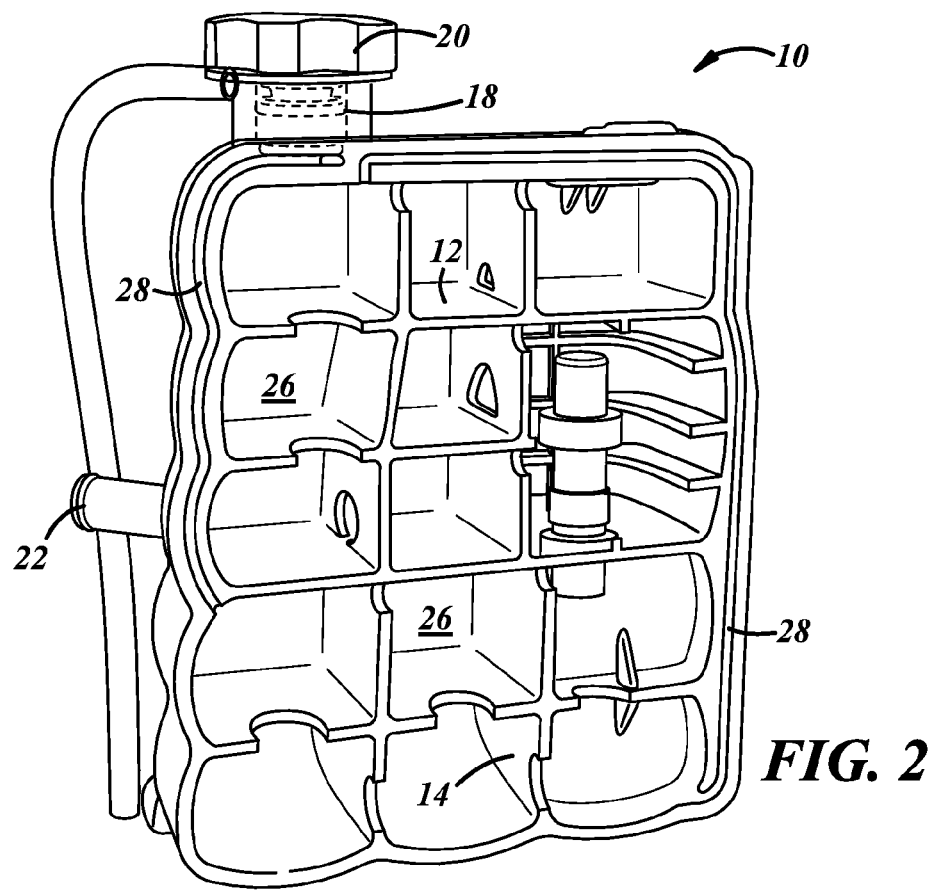
FIG. 2 shows the tank according to a number of variations.

Referring now to the variation illustrated in FIG. 2, the tank 10 may be separated into the fluid portion 12 and the expansion portion 14. As illustrated in FIG. 2, the expansion portion 14 may be disposed directly below the fluid portion 12. Moreover, both the fluid portion 12 and the expansion portion 14 of the tank 10 may include a variety of chambers 26. Moreover, the tank 10 may additionally include at least two channels 28 which may be disposed between the fluid portion 12 and the expansion portion 14 in order to move fluid and/or air pressure. Additionally, the tank 10 may further include a sensor portion which may be constructed and arranged to detect fluid level.

Figure 3:
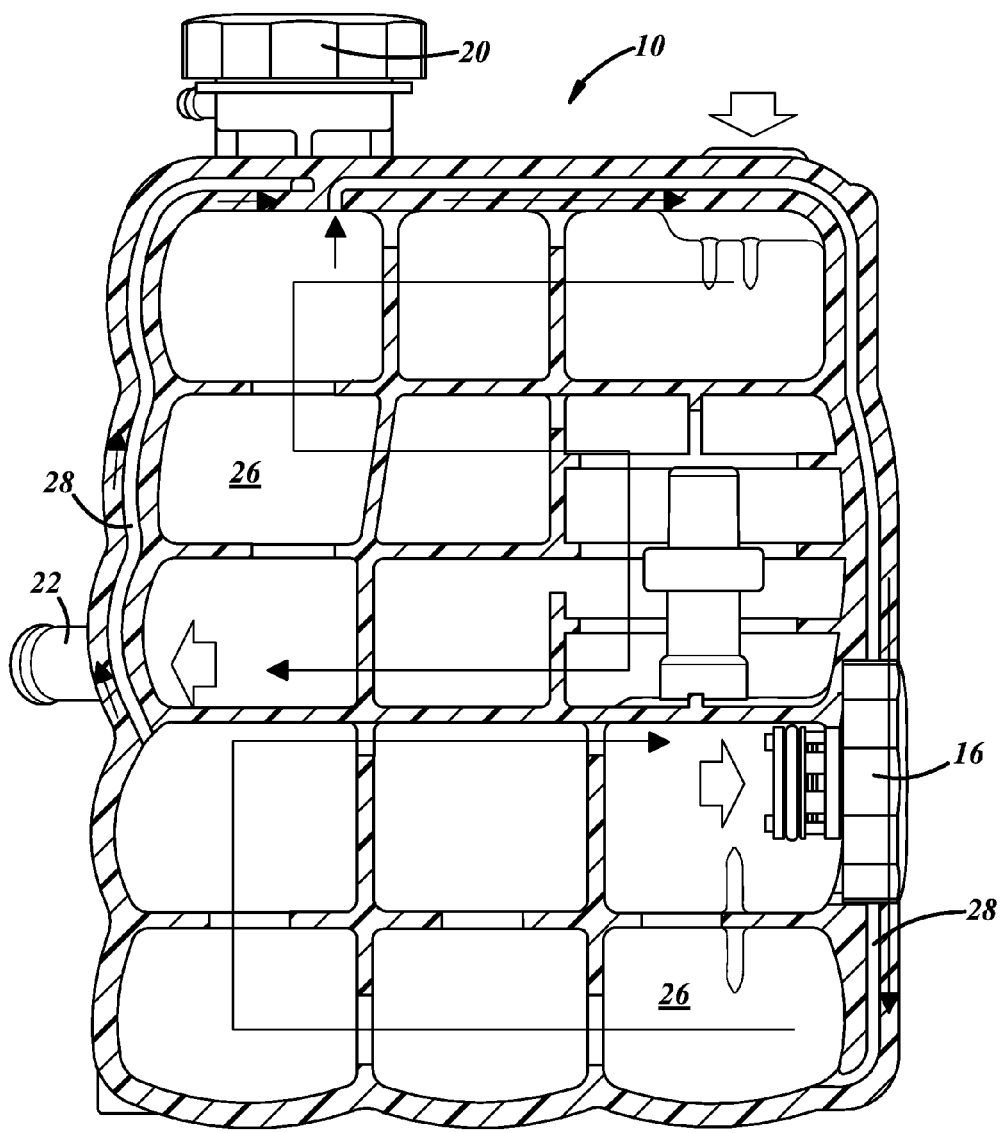
FIG. 3 shows the tank according to a number of variations.

Referring now to the variation illustrated in FIG. 3, in operation, fluid may flow in the inlet portion 18 and into the fluid portion 12. During operation, the fluid may expand until the entire fluid portion 12 may be full. Once the entire fluid portion 12 is full, any expansion fluid may flow downward through at least one of the channels 28 and down into the expansion portion 14. It is contemplated as illustrated in FIG. 3 that the fluid may begin at the bottom most portion of the expansion portion 14, once expanded from the fluid portion, and then may flow upwards. It is contemplated that the fluid may expand upward toward the pressure relief cap 16. When desired by a user, the pressure relief cap may be slowly removed and pressure may be released into the atmosphere.

Figure 4:
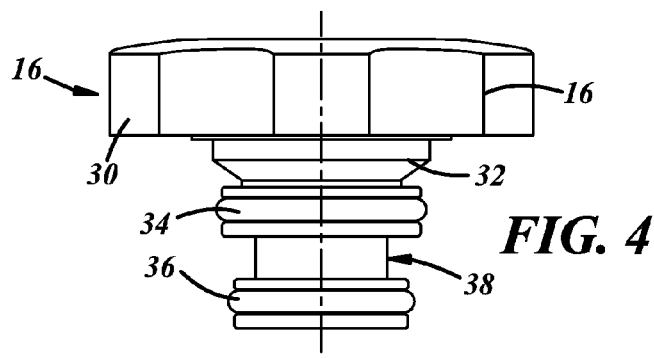
FIG. 4 shows a relief cap according to a number of variations.
Figure 5:
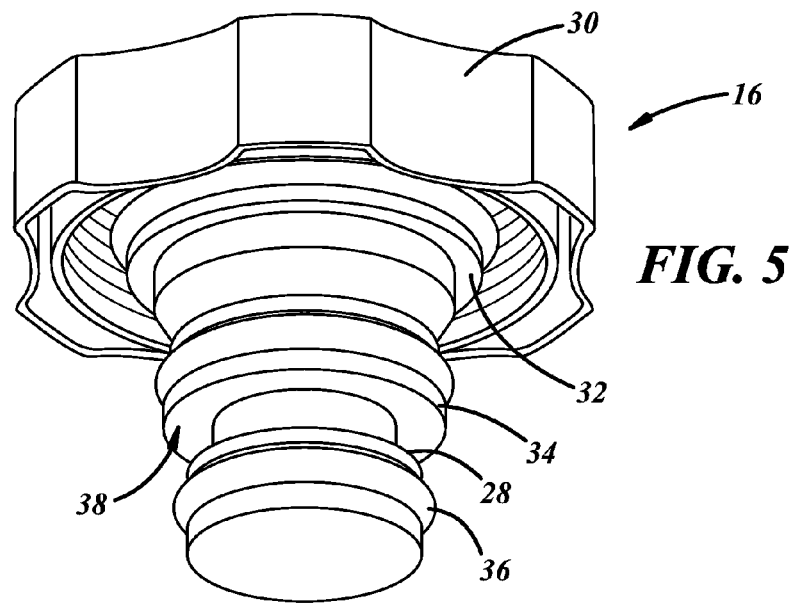
FIG. 5 shows the relief cap according to a number of variations.

Referring now to the variations illustrated in FIGS. 4 and 5, the pressure relief cap 16 may be comprised of aluminum, steel, a plastic polymer or any other material as desired by one of ordinary skill in the art. Moreover, the pressure relief cap 16 may include a cap portion 30 which may be constructed and arranged to fit a user's hand to allow ease of removability of the pressure relief cap 16. Moreover, the pressure relief cap 16 may include a top seal 32, a middle seal 34, and a bottom seal 36. It is contemplated as illustrated in FIGS. 4 and 5 that the top seal 32, the middle seal 34 and the bottom seal 36 may be O-ring seals. It is additionally contemplated that portions between the top seal 32 and the middle seal 34, and the bottom seal 36 and the middle seal 34 may include a cut out portion 38 which may extend completely around a circumference of the pressure relief cap 16. It is additionally contemplated that one or more of the bottom seal 36, the middle seal 34, or the top seal 32 may include a tapper.

As illustrated in the variations shown in FIGS. 4 and 5, it is contemplated that the top seal 32 may have a larger diameter than the middle 34 seal. Moreover, it is contemplated that the middle seal 34 may have a larger diameter than the bottom seal 36. It is also contemplated that each of the top seal 32, middle seal 34 and bottom seal 36 may have similar diameters as desired by one of ordinary skill in the art. It is additionally contemplated that the middle seal 34 and the bottom seal 36 may have the same or similar diameter while the top seal 32 may include a larger diameter. It is contemplated that the top seal 32, middle seal 34 and bottom seal 36 may be comprised of a rubber or other polymer material which may be designed to securely seal the pressure relief cap 16.

Figure 6:
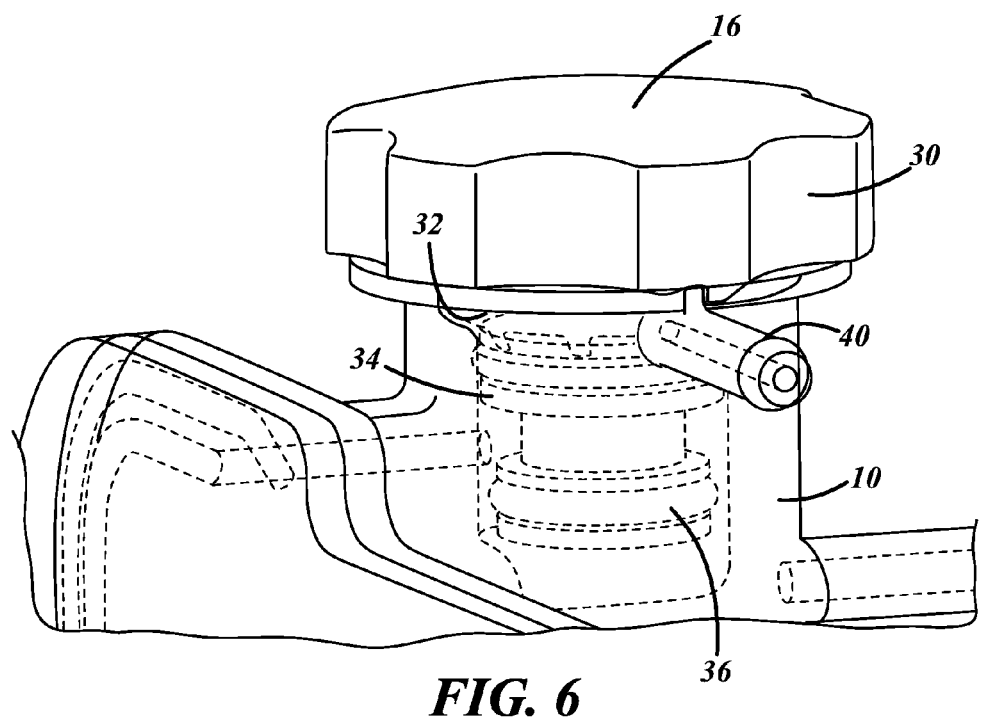
FIG. 6 shows the tank and the relief cap according to a number of variations.

Referring now to the variation illustrated in FIG. 6, it is contemplated that the tank 10 may further include an expansion vent 40. The expansion vent 40 may be disposed integrally on the tank 10 and may be disposed adjacent to the pressure relief cap 16. It is contemplated that the expansion vent 40 may be constructed and arranged to allow pressure to exit the tank 10 and into the atmosphere when desired by a user. It is also contemplated that when the pressure relief cap 16 is fully sealed, no air is released through the expansion vent.

Referring now to the variations illustrated in FIGS. 7A-7D, it is contemplated that the pressure relief cap 16 may be moved from a completely closed position 50 and then to a first intermediate position 52, and then to a second intermediate position 54 and then finally to an open position 56. When the pressure relief cap 16 is disposed in the closed position 50, as illustrated in FIG. 7A, each of the top seal 32, the middle seal 34 and the bottom seal 36 may be completely sealed in the tank 10 such that no air may be released into the ambient through the expansion vent 40 or elsewhere. When the pressure relief cap 16 is in the first intermediate position 52, as illustrated in the variation shown in FIG. 7B, the top seal 32 and the bottom seal 36 remain in a completely sealed position. The middle seal 34 may disengage from the tank 10 and may allow pressurized air which may come up from the expansion portion 14 of the tank 10 out into the ambient. The pressurized air may be removed through the expansion vent 40 while the pressure relief cap 16 remains sealed on the top 32 and bottom seal 36. Next, the middle seal 34 and the bottom seal 36 may be disengaged, as illustrated in the variation shown in FIG. 7C. When the middle and bottom seals 34,36 are disengaged, the pressure relief cap 16 may be disposed in the second intermediate position 54. In the second intermediate position 54, additional air may come up from the expansion portion 14 and out into the atmosphere. The air may be released through the expansion vent 40 while the top seal of the pressure relief cap 16 remains completely sealed. Finally, the pressure relief cap 16 may be moved into the completely opened position 56 as illustrated in FIG. 7D, in the open position 56, the pressure relief cap 16 including each of the top seal 32, the middle seal 34 and the bottom seal 36 may be completely disengaged from the tank which may allow pressurized air to be removed from the tank through a pressure relief opening 58 and additionally through the expansion vent 40. It is contemplated that by opening the pressure relief cap 16 through the steps shown in FIGS. 7A-7D, a user may be able to open the pressure relief cap 16 safely regardless of the temperature, pressure, or other conditions of the tank.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a tank which may include a fluid portion and may additionally include an expansion portion which may be disposed below the fluid portion. Moreover, a three seal pressure relief cap may be constructed and arranged to allow a user to safely remove the pressure relief cap at any temperature.

Variation 2 may include the tank as set forth in Variation 1 and may further include a plurality of chambers which may be disposed in both the fluid portion and in the expansion portion. Moreover, the chambers may be constructed and arranged to move fluid and/or air volume through the plurality of chambers.

Variation 3 may include the tank as set forth in any of Variations 1-2 wherein the pressure relief cap may be configured to move from a closed position, to a first intermediate position, to a second intermediate position, and to an open position.

Variation 4 may include the tank as set forth in any of Variations 1-3 wherein the pressure relief cap may include a top seal, a middle seal and a bottom seal.

Variation 5 may include the tank as set forth in any of Variations 1-4 wherein the top seal, the middle seal and the bottom seal may be completely sealed when the pressure relief cap is in the closed position.

Variation 6 may include the tank as set forth in any of Variations 1-5 wherein the pressure relief cap is in the first intermediate position when the middle seal is disengaged and the top seal and the bottom seal remain completely sealed.

Variation 7 may include the tank as set forth in any of Variations 1-6 wherein the pressure relief cap may be in the second intermediate position when the middle seal and the bottom seal may be disengaged and the top seal may remain completely sealed.

Variation 8 may include the tank as set forth in any of Variations 1-7 wherein in the open position, each of the top seal, the middle seal and the bottom seal may be disengaged.

Variation 9 may include a product which may include a fluid inlet and a fluid portion which may be disposed adjacent to the fluid inlet. A fluid may flow from the inlet through the fluid portion. Further, the product may additionally include an expansion portion which may be disposed below the fluid portion. The fluid may expand and once the fluid portion is full, the fluid may flow down into the expansion portion. Moreover, the product may include a pressure relief cap which may be disposed at an end of the expansion portion. The pressure relief cap may be constructed and arranged to allow a user to safely remove the pressure relief cap at any temperature.

Variation 10 may include the product as set forth in Variation 9 wherein the pressure relief cap may be configured to move from a closed position to a first intermediate position to a second intermediate position and to an open position. Moreover, the pressure relief cap may include a top seal, a middle seal and a bottom seal.

Variation 11 may include the product as set forth in any of Variations 9-10 wherein the top seal, the middle seal and the bottom seal may be completely sealed in the closed position and the top seal, the middle seal and the bottom seal may be completely disengaged when the pressure relief cap is in the open position.

Variation 12 may include the product as set forth in any of Variations 9-11 wherein the pressure relief cap may be in the first intermediate position when the middle seal is disengaged and the top seal and the bottom seal remain completely sealed.

Variation 13 may include the product as set forth in any of Variations 9-12 wherein the pressure relief cap may be in the second intermediate position when the middle seal and the bottom seal may be disengaged and the top seal may remain completely sealed.

Variation 14 may include a method which may include flowing fluid from an inlet into a top portion of the tank. The fluid may expand until the top portion is full and fluid may flow down into an expansion portion. The fluid may continue expanding in the expansion portion upward towards the pressure relief cap. The pressure relief cap may be safely removed at any temperature. Additionally, the pressure relief cap may include a top seal, a middle seal and a bottom seal.

Variation 15 may include the method as set forth in Variation 14 wherein the step of safely removing the pressure relief cap at any temperature may include moving the pressure relief cap from a closed position to an intermediate position, to a second intermediate position, and to an open position.

Variation 16 may include the method as set forth in any of Variations 14 or 15 wherein the top seal, the middle seal and the bottom seal may be completely sealed in the closed position.

Variation 17 may include the method as set forth in any of Variations 14-16 wherein the pressure relief cap may be in the first intermediate position when the middle seal is disengaged and the top seal and the bottom seal remain completely sealed.

Variation 18 may include the method as set forth in any of Variations 14-17 wherein the pressure relief cap may be in the second intermediate position when the middle seal and the bottom seal may be disengaged and the top seal remains completely sealed.

Variation 19 may include the method as set forth in any of Variations 14-18 wherein the open position, each of the top seal, the bottom seal and the middle seal may be completely disengaged.

Variation 20 may include the method as set forth in any of Variations 14-19 wherein when the pressure relief cap is in the first intermediate position, hot and pressurized air may come up from the expansion portion and out to ambient through a hose.

The above description of select variations within the scope of the invention is merely illustrative in nature and, thus, variations or variants thereof are not to be regarded as a departure from the spirit and scope of the invention.

What is claimed is:

1. A tank comprising:
  a fluid portion;
  an expansion portion disposed below the fluid portion; and
  a three-seal pressure relief cap having three seals constructed and arranged to allow a user to safely remove the pressure relief cap at any temperature,
  an expansion vent provided in the tank and wherein the relief cap is constructed and arranged to allow the expansion vent to be selectively opened and closed by movement of the three-seal pressure relief cap and so that at least one of the seals of the three seals is engaged with the tank while the expansion vent is open.

2. The tank of claim 1, further comprising a plurality of chambers disposed in both the fluid portion and in the expansion portion and constructed and arranged to move fluid and air volume through the plurality of chambers.

3. The tank of claim 1, wherein the pressure relief cap is configured to move from a closed position, to a first intermediate position, to a second intermediate position, and to an open position.

4. The tank of claim 3, wherein the pressure relief cap includes a top seal, a middle seal, and a bottom seal.

5. The tank of claim 4, wherein the top seal, the middle seal, and the bottom seal are completely sealed when the pressure relief cap is in the closed position.

6. The tank of claim 4, wherein in the open position each of the top seal, the middle seal, and the bottom seal are disengaged.

7. A tank comprising:
  a fluid portion;
  an expansion portion disposed below the fluid portion; and
  a three-seal pressure relief cap constructed and arranged to allow a user to safely remove the pressure relief cap at any temperature, wherein the pressure relief cap is configured to move from a closed position, to a first intermediate position, to a second intermediate position, and to an open position, wherein the pressure relief cap includes a top seal, a middle seal, and a bottom seal, wherein the pressure relief cap is in the first intermediate position when the middle seal is disengaged and the top seal and the bottom seal remain completely sealed.

8. A tank comprising:
  a fluid portion;
  an expansion portion disposed below the fluid portion; and
  a three-seal pressure relief cap constructed and arranged to allow a user to safely remove the pressure relief cap at any temperature, wherein the pressure relief cap is configured to move from a closed position, to a first intermediate position, to a second intermediate position, and to an open position, wherein the pressure relief cap includes a top seal, a middle seal, and a bottom seal, wherein the pressure relief cap is in the second intermediate position when the middle seal and the bottom seal are disengaged and the top seal remains completely sealed.

9. A tank comprising:

a fluid portion;

an expansion portion disposed below the fluid portion; and a three-seal pressure relief cap constructed and arranged to allow a user to safely remove the pressure relief cap at any temperature, wherein the three-seal pressure relief cap includes a cap portion, and a top seal, a middle seal, and a bottom seal, wherein the top seal is closest to the cap portion and wherein at least one of the middle seal or bottom seal is disengageable from the tank while the top seal remains engaged with the tank.

\* \* \* \* \*